United States Patent [19]

Harries

[11] 4,066,301
[45] Jan. 3, 1978

[54] MODULATOR ASSEMBLIES FOR VEHICLE HYDRAULIC BRAKING SYSTEMS

[75] Inventor: David Anthony Harries, Solihull, England

[73] Assignee: Girling Limited, Birmingham, England

[21] Appl. No.: 673,857

[22] Filed: Apr. 5, 1976

[30] Foreign Application Priority Data

Apr. 25, 1975 United Kingdom .............. 17211/75

[51] Int. Cl.² ................................................ B60T 8/04
[52] U.S. Cl. ....................................... 303/115; 92/84; 137/509
[58] Field of Search ............. 188/181 A; 303/92, 115; 91/392; 92/84; 137/509

[56] References Cited

U.S. PATENT DOCUMENTS

| | | | |
|---|---|---|---|
| 2,847,829 | 8/1958 | Gladden | 92/84 X |
| 3,414,336 | 12/1968 | Atkin et al. | 303/115 |
| 3,495,882 | 2/1970 | Stelzer | 303/115 |
| 3,671,085 | 6/1972 | Pasek et al. | 303/115 |
| 3,865,440 | 2/1975 | Ostwald | 303/115 |

*Primary Examiner*—George E. A. Halvosa
*Attorney, Agent, or Firm*—Scrivener, Parker, Scrivener & Clarke

[57] ABSTRACT

In a modulator assembly for a vehicle anti-skid braking system comprising a housing having a chamber of which the effective volume is variable by an expander piston to modulate the pressure supplied to a wheel brake in accordance with skid conditions, the chamber comprises first and second compartments, and a valve assembly is located in the housing to control communication between the compartments. The valve assembly is closed when the expander piston is in an advanced position in which the effective volume of the chamber is substantially at a minimum so that a first area of the piston is exposed only to pressure in one of the compartments, and the valve assembly is open when the expander piston is retracted away from the advanced position so that a second area of the piston which is greater than the first is exposed to pressure in both compartments.

9 Claims, 5 Drawing Figures

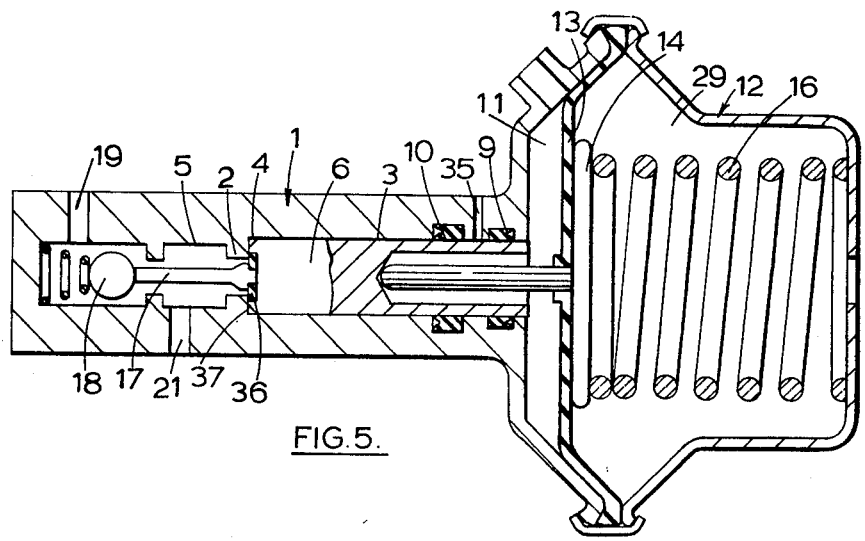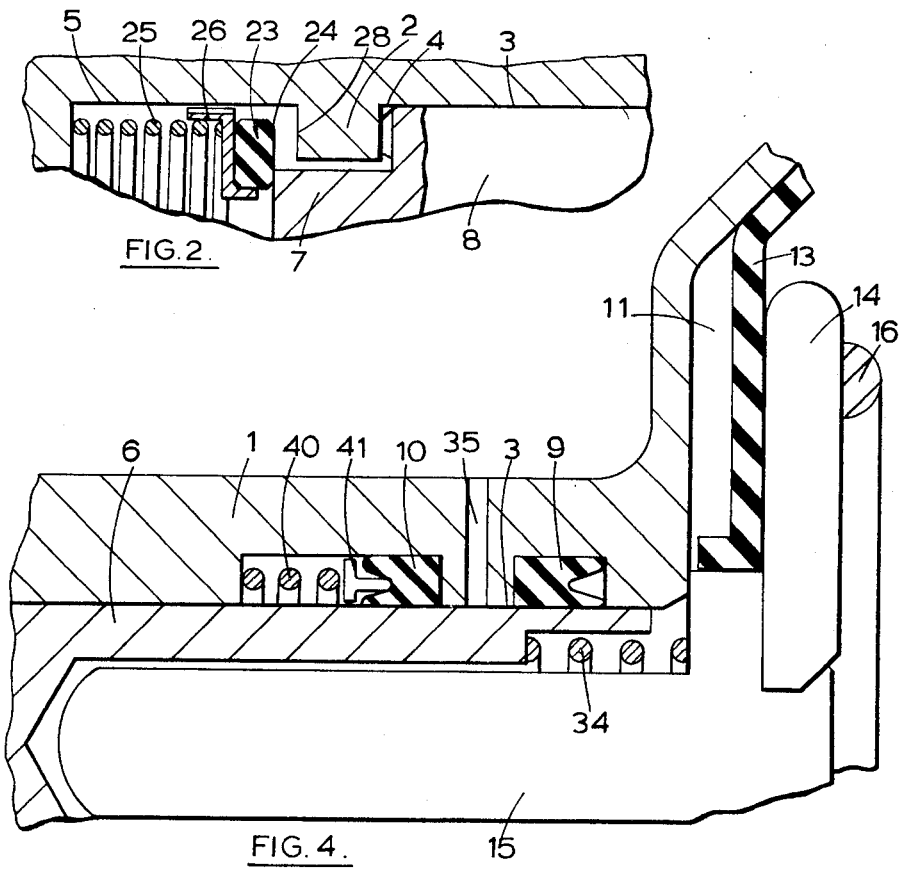

MODULATOR ASSEMBLIES FOR VEHICLE HYDRAULIC BRAKING SYSTEMS

SPECIFIC DESCRIPTION

This invention relates to modulator assemblies for vehicle anti-skid hydraulic braking system, the modulator assemblies being of the kind in which hydraulic fluid from an hydraulic master cylinder to at least one hydraulic slave cylinder of a wheel brake is adapted to be supplied through a chamber in a housing having an inlet port for connection to the master cylinder and an outlet port for connection to the slave cylinder, and an expander piston working in a bore in the housing communicating with the chamber is movable between a first advanced position in which the effective volume of the chamber is at a minimum and a control valve between the inlet port and the outlet port is open, and a second retracted position in which the control valve is closed and the effective volume of the chamber is larger, the expander piston normally being disposed in the first position but movable into the second position when the deceleration of a braked wheel operated by the slave cylinder exceeds a predetermined value, the position of the expander piston being controlled by a bias force applied to the expander piston by modulator means responsive to a signal from deceleration sensing means.

In known modulator assemblies of the kind set forth for vehicle anti-skid hydraulic braking systems the bias force must be sufficiently large to prevent the expander piston moving during a normal brake application from the advanced position towards the retracted position through a substantial distance in response to the pressure from the master cylinder acting on the free end of the expander which is exposed to the pressure in the chamber. Accordingly the bias force must be sufficiently large to prevent the expander piston from moving in that direction when the pressure from the master cylinder is theoretically the highest likely to be attained plus some reserve to allow for deterioration in the system, for example brake fade. The said highest pressure is rarely achieved during normal operation and under most anti-skid conditions in which braked wheels will lock before such a pressure is attained, for example when a vehicle is unladen or is travelling over a surface of low adhesion. The necessity of having to cater for the said highest pressure results in the provision of modulating means of a size and energy consumption substantially larger than is usually necessary to provide a bias force appropriate to most master cylinder pressures.

According to our invention in a modulator assembly of the kind set forth for a vehicle anti-skid hydraulic braking system the chamber comprises first and second axially spaced compartments, valve means are provided for controlling communication between the compartments, and the outlet port leads from the first compartment which is located between the control valve and the second compartment, the valve means being movable between a closed position when the expander piston is substantially in its advanced position and an open position when the expander piston is moved between its two position, in opposition to the bias force, a first area only of the expander piston being exposed only to the pressure in the first compartment when the valve means is in the said closed position, and a second area of the expander piston, which is greater than the first area, being exposed to the pressure in both compartments when the valve means is in the open position.

The expander piston may have a free end portion of reduced area defining the first area with the pressure in both compartments acting over the full area of the expander piston when the valve means is open.

Alternatively when the valve means is in the closed position a valve head at the free end of the expander piston engages with a radial shoulder of reduced diameter so that the pressure in the first compartment acts over an effective area which is smaller than the full area of the free end of the piston over which the pressure in both compartments acts when the valve means is open.

By reducing the effective area of the expander piston over which the master cylinder or brake applying pressure acts initially to urge the expander piston into its retracted position upon decrease in the bias force, and in consequence the retraction force, enables the bias force itself to be reduced to a value which is slightly greater than the theoretically highest pressure likely to be generated by the master cylinder acting over the first area of the expander piston.

After the valve means has opened, the effective volume of the chamber increases by the volume of the piston which is withdrawn from the chamber into the bore.

The bias force is normally sufficiently strong to withstand a maximum master cylinder pressure acting on the first area of the expander piston. The said maximum pressure is rarely achieved during normal operation and under anti-skid conditions the wheels will lock at a much lower value of master cylinder pressure. Therefore by providing the piston with different effective areas, at the termination of a skid, due to the larger area of the piston the pressure at which the brakes are re-applied will be lower than the pressure at which the brakes were applied before skidding occurred. Thus, the invention ensures that the skid maximum pressure can be achieved if necessary but limits to a substantially lower figure the work which has to be done to overcome the bias force.

During the normal operation the bias force is opposed by the pressure from the master cylinder acting on the first area of the expander piston and, after a skid has been corrected, the bias force is opposed by the pressure from the master cylinder acting on the second area of the expander piston, so that re-application of the brakes is a controlled condition.

When closed the valve means acts as a one-way valve to permit flow only in one direction from the second compartment into the first compartment.

Some embodiments of our invention are illustrated in the accompanying drawings in which:

FIG. 2 is a portion of FIG. 1 drawn on an enlarged scale and showing a modified valve means:

FIG. 4 is a portion of the modulator assembly of FIG. 1 particularly suitable for use with the modification of FIG. 3; and FIG. 5 is a longitudinal section through a modulator assembly similar to FIG. 1 but including modified valve means.

Figure 1:
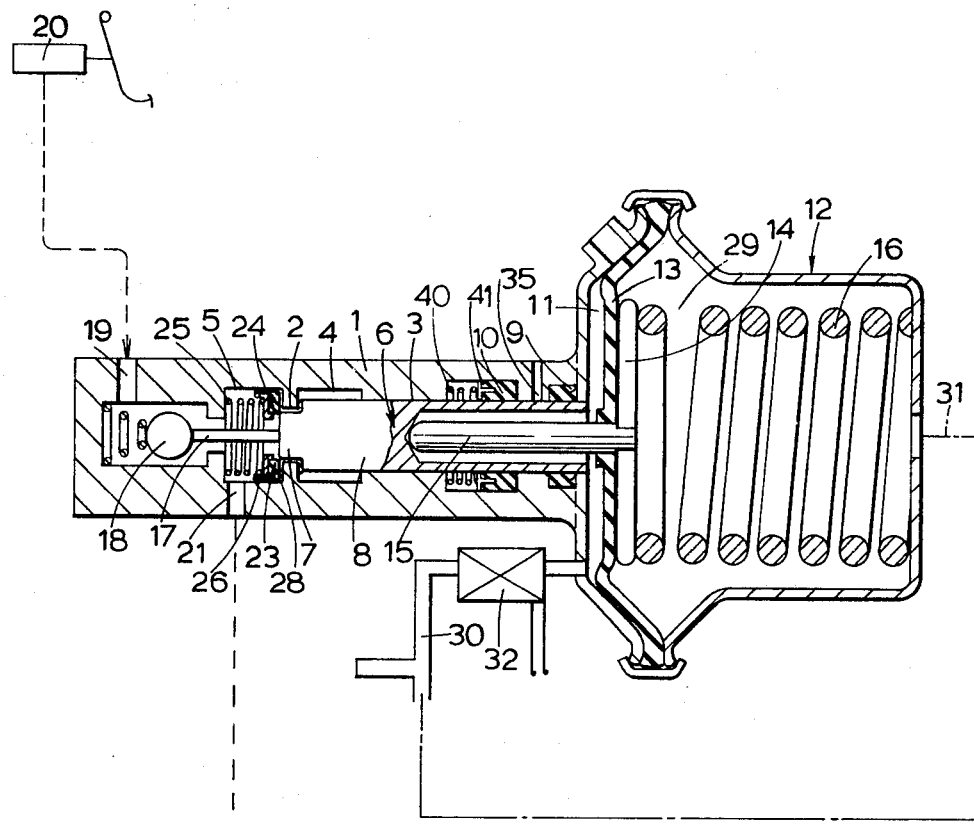
FIG. 1 is a longitudinal section through a modulator assembly for a vehicle anti-skid hydraulic braking system.

The modulator assembly illustrated in FIG. 1 of the drawings comprises a housing 1 provided with a longitudinally extending stepped bore having a portion 2 of smaller diameter and a portion 3 of greater diameter.

The bore portions 2 and 3 are separated by a first cylindrical compartment 4 of a diameter greater than that of the bore portion 3, and a second cylindrical compartment 5 is disposed in the housing 1 at the end of the bore portion 2 remote from the compartment 4.

An expander piston 6 of stepped outline has a free end portion 7 of reduced diameter received in the bore portion 2 and an enlarged portion 8 working through spaced seals 9 and 10 in the bore portion 3. The opposite end of the piston 6 extends into an enlarged chamber 11 of modulating means 12 where it is acted upon by a flexible diaphragm 13 which is sealed at its peripheral edge to the wall of the chamber 11. The diaphragm 13 acts on the piston 6 through a reinforcing plate or piston 14 and a rod 15. A spring 16 normally acts through the diaphragm 12 and the plate or piston 14 to hold the expander piston 6 in an operative advanced position in which the piston portion 7 projects by a small distance into the compartment 5 and acts through a push-rod 17 to hold open a spring loaded valve 18 controlling communication between an inlet port 19 in the housing 1 connected to an hydraulic master cylinder 19 and an outlet port 21 leading from the compartment 5 to the actuator slave cylinder of a wheel brake 22.

Valve means 23 controls communication between the compartments 4 and 5 which, together with the bore portion 2, define a chamber of which the volume is variable. The valve means 23 comprises an annular seal 24 of resilient material constituting a valve member which is urged by a spring 25 and a spring abutment 26 towards the end wall 28 of the compartment 5 at the outer end of the bore portion 2. When the expander piston 6 is in its advanced position with the master cylinder inoperative, the piston portion 7 seals against or within the seal 23 but holds the seal 24 away from the end wall 28 so that the two compartments 4 and 5 are in communication.

When the master cylinder 20 is operated under normal braking conditions hydraulic fluid passes from the inlet port 19 to the brake 22 through the compartment 5 and the outlet port 21. Since the seal 24 is spaced from the end wall 28 the compartment 4 is in open communication with the compartment 5.

The pressure supplied to the brake 22 increases until that pressure acting over the total area of the enlarged portion 8 of the piston 6 attains a first value sufficient to generate a force greater than the force in the spring 16 acting in the opposite direction. Thus the piston 6 moves through a small distance against the loading in the spring 16 until the seal 24 seats against the end wall 28 to isolate the compartment 5 from the compartment 4. The pressure fluid then acts over only the area of the end portion 7 of reduced diameter and the pressure applied to the brake can increase to a maximum value equal to the load in the spring 16 divided by the area of the end portion 7.

When the braked wheel skids the loading of the spring 16 is reduced and the piston 6 moves away from the chamber 5 and relatively away from the valve 18. Initial movement of the piston 6 withdraws the piston from the seal 24, allows the valve 18 to close to isolate the master cylinder 20 from the brake 22 and thereafter reduce the pressure applied to the brake by increasing the effective value of the compartment 4.

At the termination of the skid, the pressure admitted to the chamber 11 is reduced so that the spring 16 is operate to urge the piston 6 in the opposite direction to decrease the effective volume of the compartment 4 and to re-pressurise the fluid applied to the brake 22 with the valve 18 remaining closed. The maximum value to which the pressure applied to the brake can rise with the valve 18 closed is equal to the loading of the spring 16 divided by the cross-sectional area of the enlarged portion of the piston, which is less than the maximum pressure which could have been achieved had not the piston 6 previously been moved away from the seal 24 under anti-skid conditions. Thus this pressure is less than the said maximum pressure which could otherwise have been achieved by the ratio of the two areas of the piston 6.

The modulator means 12 may be controlled in any convenient manner to respond to skid conditions. In one construction the chamber 11 and a chamber 29 on the opposite side of the diaphragm 13 are both connected to a common source of vacuum through pipe-lines 30 and 31, and a control valve assembly 32 is located in the pipe-line 30 between the source and the chamber 11.

When a skid occurs an electronic sensor sensing deceleration of the braked wheel closes the control valve assembly 32 to isolate the chambers 11 and 29. The valve assembly 32 is thereafter operative to admit air into the chamber 11 so that the diaphragm 13 is subjected to a differential pressure and moves relatively away from the expander piston 6 and compresses the spring 16 which produces the bias force.

In the modification of FIG. 2 the compartment 4 comprises a portion at the end of and of the same diameter as the bore 3 and the piston portion 7 only engages with the seal 24.

Figure 3:
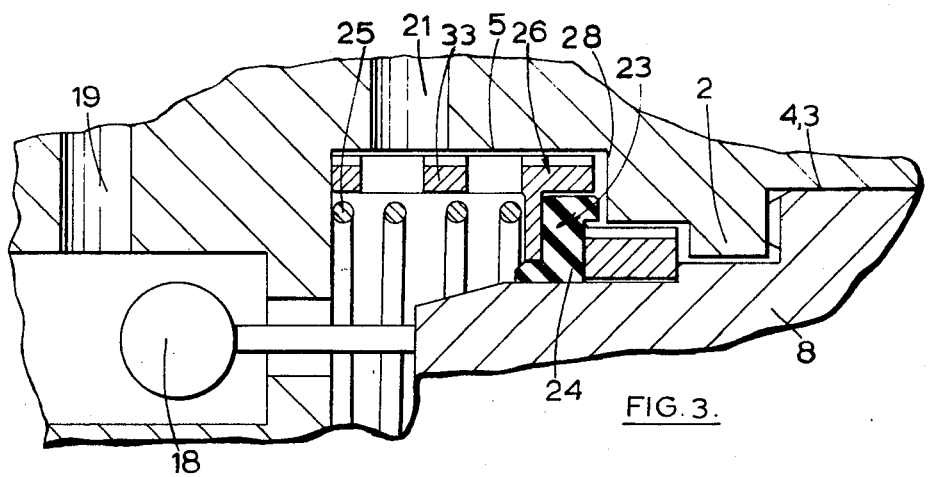
FIG. 3 is a portion on the modulator assembly of FIG. 1 showing a modification.

In the modification of FIG. 3 the piston portion 7 is slightly pointed or chamfered at its free end and in the position shown extends through the seal 24 which seals against the full diameter portion of the piston.

The spring abutment 26 comprises an apertured retainer 33 of an effective length slightly less than the effective axial length of the compartment 5 so that the seal 24 and the retainer 33 are permitted a limited movement in an axial direction away from the end wall 28.

As in the embodiments described above in an "off" position of brake or until the braking pressure attains the "first" value the seal 24 is held away from the seating face 28 by the positive engagement of a shoulder on the piston 6 with the retainer 33 and the seal 24 seals against the full diameter of the piston. This seal is maintained during all normal braking conditions until the pointed free end enters the seal under skid conditions which occurs shortly after the valve 18 has closed.

This construction has the advantage that the point at which the valve means 23 can open under skid conditions whilst engaging with the face 28 can be accurately determined and is not affected by variations in the area of contact between the piston 6 and the seal 23, or vibrations which might otherwise unseat the seal 23 from seating face 28 and reduce the braking pressure by placing the two compartments 4 and 5 in communication after the "first" value had been attained which otherwise would reduce the pressure.

The construction and operation of the modification of FIG. 3 is otherwise the same as the modulator assemblies of FIGS. 1 and 2 and corresponding reference numerals have been applied to corresponding parts.

In the modification of FIG. 4 a compression spring 34 acts between the rod 15 and the expander piston 6 to permit a small movement of the expander piston 6 relative to the rod 15 when the brake is applied. This has the advantage that the piston 6 moves with respect to both seals 9 and 10 when the brake is applied thereby ensuring that the seal 9 has not stuck to the piston.

When the modification of FIG. 4 is incorporated in a modulator assembly including valve means of FIG. 3, the piston 6 moves with respect to the seals 9 and 10 and the rod 15 until the seal 24 seals against the face 28 to isolate the two compartments 4 and 5 from each other.

Failure of either seal 9 and 10 will be indicated by external leakage through a radial bleed passage 35 between the seals and communication with the bore 3.

The embodiments of FIGS. 1 and 4 also incorporates compression springs 40 and spring abutments 41 acting on the seal 10 to bias it towards the bleed passage 35. Again this is of particular advantage when the valve means of FIG. 3 is incorporated into FIG. 4.

As the piston 6 moves away from the chamber 5 under skid conditions, the volume in the compartment 4 will start to increase before the valve means 23 opens to provide communication between the two compartments 4 and 5. This will cause a pressure drop in the compartment 4, possibly below atmospheric pressure, which could allow air to be drawn into the system past the seat 10.

To prevent this happening the seal 10 is held in place by the spring 40 which will allow the seat to move inwardly if the internal pressure tends to fall below atmospheric pressure so preventing air ingress by reducing the volume of the compartment 4 by an amount equivalent to the increase caused by the initial movement of the piston 6 away from the compartment 5.

In the modulator assembly of FIG. 5 the expander piston 6 is of constant diameter throughout its axial length and at its free end adjacent to the valve 18 carries a face seal 36 for engagement with a face 37 shoulder at the step in diameter between the bore portions 2 and 3 or on the adjacent face 37 at a radial shoulder between the compartments 4 and 5.

During normal braking the pressure from the master cylinder acts over a first area of the piston 6 comprising only that area at the end of the piston which is exposed when the face seal 36 engages with the face 37. Thereafter, under skid conditions, the seal 36 moves away from the face 37 to provide communication between the two compartments 4 and 5 and enables the total area of the expander piston 6 to be exposed to master cylinder pressure.

The construction and operation of the modulator assembly of FIG. 5 is otherwise the same as that of FIG. 1 and corresponding reference numerals have been applied to corresponding parts.

I claim:

1. A modulator assembly for a vehicle anti-skid braking system comprising a housing having an inlet port for connection to an hydraulic master cylinder, an outlet port for connection to the slave cylinder of a wheel brake, a chamber through which said inlet port communicates with said outlet port and having an effective volume which is variable and a bore communicating with said chamber, a control valve located between said inlet port and said outlet port, an imperforate expander piston working in said bore, said expander piston being movable between a first advanced position in which said effective volume is at a minimum and said control valve is open and a second retracted position in which said control valve is closed and said effective volume is larger, and modulator means responsive to a signal from means for sensing deceleration of a wheel braked by said brake for applying a bias force to said expander piston to determine the position thereof, said expander piston normally being disposed in said first position but movable into said second position by said modulator means when deceleration of said braked wheel exceeds a predetermined value, wherein said chamber comprises a first compartment, and a second compartment spaced axially from said first compartment and located at the end of said first compartment which is remote from said control valve, valve means directly operable by, and axially aligned, with said expander piston are provided for controlling communication between said first and second compartments, and said outlet port leads from said first compartment, said valve means being movable between a closed position when said expander piston is substantially in said advanced position and an open position when said expander piston is moved between said first and second position, a first area only of said expander piston which is smaller than a second total area thereof being exposed only to pressure in said first compartment when said valve means is in the said closed position, and said second total area of said expander piston being exposed to pressure in both said first and second compartments when said valve means is in said open position.

2. A modulator assembly as claimed in claim 1, wherein said expander piston has a free end portion of reduced diameter defining said first area.

3. A modulator assembly as claimed in claim 2, wherein a shoulder is located between said first and second compartments, and said valve means comprises a seal sealingly engagable with both said free end portion and said shoulder when said valve means is in said closed position.

4. A modulator assembly as claimed in claim 1, incorporating two axially spaced seals through which said expander piston works, and a rod through which said modulator means acts on said expander piston, a compression spring being located between said expander piston and said rod to permit a small movement of said piston relative to said rod when said inlet port is pressurised.

5. A modulator assembly for a vehicle anti-skid braking system comprising a housing having an inlet port for connection to an hydraulic master cylinder, an outlet port for connection to the slave cylinder of a wheel brake, a chamber through which said inlet port communicates with said outlet port and having an effective volume which is variable and a bore communicating with said chamber, a control valve located between said inlet port and said outlet port, an expander piston working in said bore and having a free end portion of a first area less than a second total area thereof, said expander piston being movable between a first advanced position in which said effective volume is at a minimum and said control valve is open and a second retracted position in which said control valve is closed and said effective volume is larger, and modulator means responsive to a signal from means for sensing deceleration of a wheel braked by said brake for applying a bias force to said expander piston to determine the position thereof, said expander piston normally being disposed in said first position but movable into said second position by said modulator means when deceleration of said braked wheel exceeds a predetermined value, wherein said chamber comprises a first compartment, a second compartment spaced axially from said first compartment and located at the end of said first compartment which is remote from said control valve, and a shoulder located between said compartments, valve means directly operable by, and axially aligned with, said expander piston are provided for controlling communication between said first and second compartments, and said outlet port leads from said first compartment, said valve means comprising a seal sealingly engagable with both said free end portion and said shoulder when said valve means is in a closed position and said first area only is exposed to pressure in said first compartment, said free end portion being movable away from said seal to provide communication between said compartments when said expander piston is moved into said second position whereafter said second total area of said piston is exposed to pressure in both said first and second compartments.

6. A modulator assembly as claimed in claim 5, wherein said free end portion projects into said first compartment through said seal.

7. A modulator assembly as claimed in claim 5, incorporating a spring for urging said seal into engagement with said shoulder, wherein said seal is normally held away from said shoulder by said expander piston when said piston is in said advanced position.

8. A modulator assembly as claimed in claim 7, including a spring abutment through which said spring acts on said seal.

9. A modulator assembly as claimed in claim 8, wherein said spring abutment comprises an apertured retainer in which said seal is located, and said retainer is of a length slightly less than that of said first compartment so that said seal and said retainer are permitted a limited movement in an axial direction with respect to said shoulder.

* * * * *